G. W. MITCHELL.
Car Brake.

No. 26,365.

2 Sheets—Sheet 1.

Patented Dec. 6, 1859.

Witnesses:

Inventor:

G. W. MITCHELL.
Car Brake.

No. 26,365.

Patented Dec. 6, 1859.

Witnesses:

Inventor:

UNITED STATES PATENT OFFICE.

G. W. MITCHELL, OF JACKSON, TENNESSEE.

MODE OF OPERATING CAR-BRAKES.

Specification of Letters Patent No. 26,365, dated December 6, 1859.

*To all whom it may concern:*

Be it known that I, G. W. MITCHELL, of Jackson, in the county of Madison and State of Tennessee, have invented a new and useful Machine for Operating Car-Brakes; and I do hereby declare that the following is a clear, full, and exact description of the construction and operation of the same, reference being had to the annexed drawings, making a part of this specification, in which—

Figure 1:
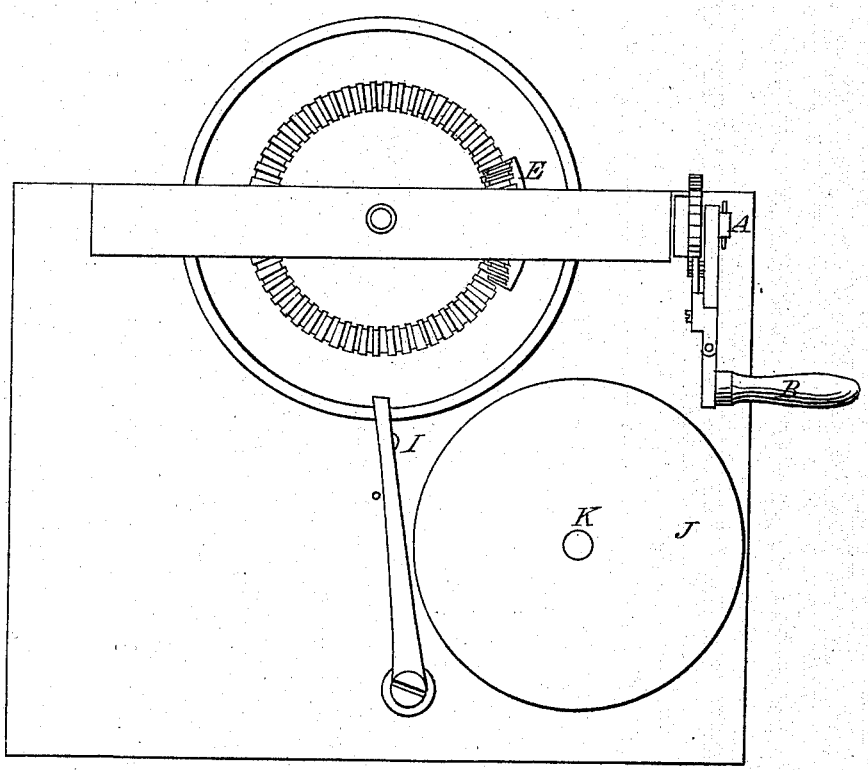
Figure 3:
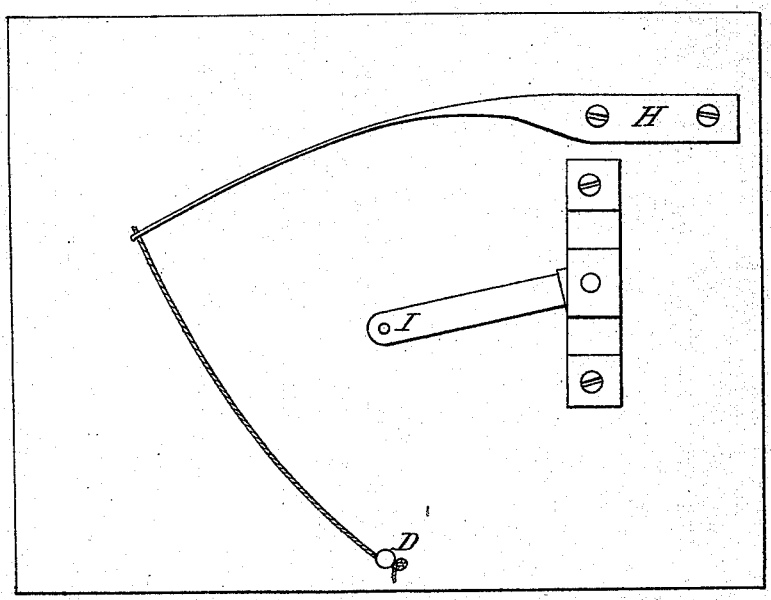
Figure 2:
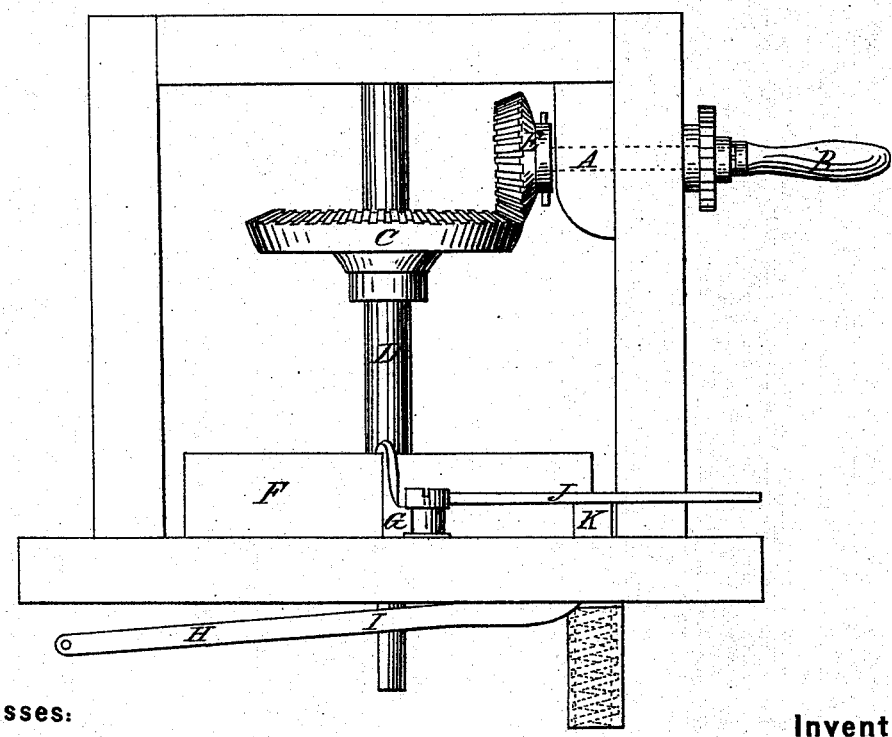

Figure 1 is a top view, Fig. 2 is a front view, and Fig. 3 a bottom view.

The nature of my invention consists first in a pair of beveled wheels the small one of which is placed on a horizontal shaft A as shown in Fig. 2, driven by the crank B. The large beveled wheel C is placed on a perpendicular shaft D and is driven by the small beveled wheel E. Also at the bottom of the perpendicular shaft D is placed a flanged or ratchet wheel F which is permanently secured to the perpendicular shaft D and is operated by a hooked pawl G which hooked pawl maintains the pressure of the brake H (which is illustrated by a spring shown in Fig. 3) until released by a pin I attached to and operated by a spring platform J, which spring platform J has a shaft in its center extending through the floor as shown in Fig. 2 at K, upon which is placed a coil spring which presses the platform J and pin I upward, which upward movement of the pin I relieves the brake.

What I claim as my invention and desire to secure by Letters Patent is—

1. The flanged or ratchet wheel and its hooked pawl as described and shown in Fig. 2 at F G.

2. I claim also the spring platform and the pin attached and stop pin L Fig. 2, as described and for the purpose set forth.

G. W. MITCHELL.

Attest:
JOHN S. HOLLINGSHEAD,
AMON DUVALL.